E. E. WEBSTER.
FOCUSING DEVICE FOR CAMERAS.
APPLICATION FILED FEB. 9, 1917.
1,302,255.
Patented Apr. 29, 1919.
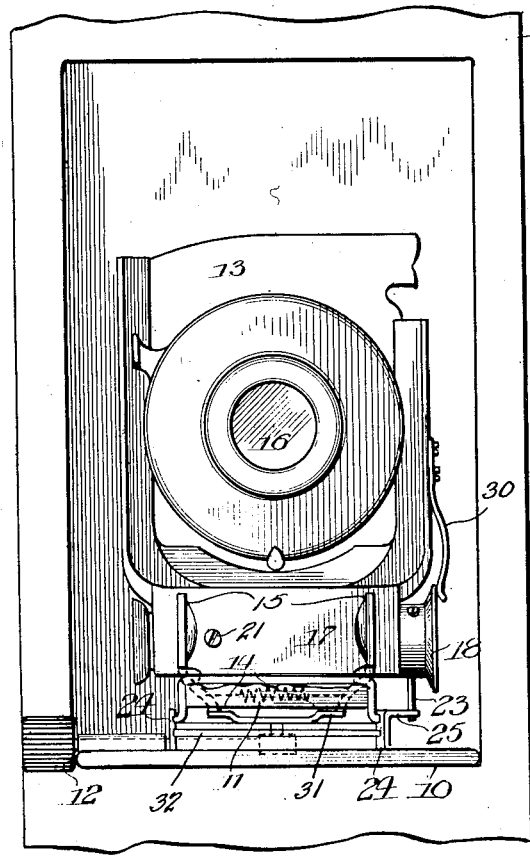
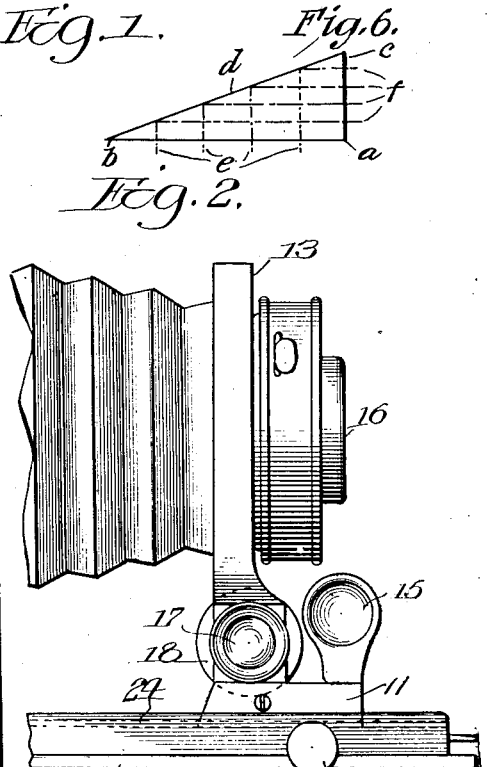
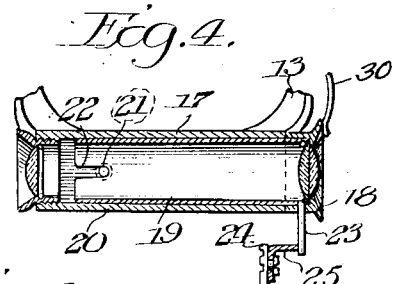
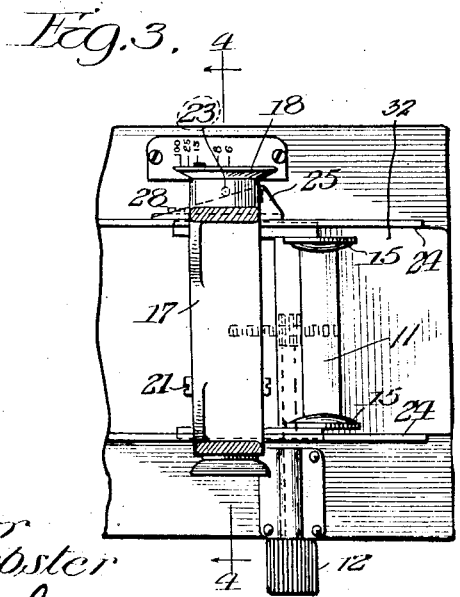
Inventor
Edgar E. Webster
by Alley W. Zabel atty.

UNITED STATES PATENT OFFICE.

EDGAR E. WEBSTER, OF CHICAGO, ILLINOIS.

FOCUSING DEVICE FOR CAMERAS.

1,302,255.   Specification of Letters Patent.   Patented Apr. 29, 1919.

Application filed February 9, 1917. Serial No. 147,532.

*To all whom it may concern:*

Be it known that I, EDGAR E. WEBSTER, a citizen of the United States, residing at Chicago, in the county of Cook and State of Illinois, have invented a certain new and useful Improvement in Focusing Devices for Cameras, of which the following is a full, clear, concise, and exact description, reference being had to the accompanying drawings, forming a part of this specification.

My invention relates to focusing devices for cameras or similar apparatus and may in a sense be called a range finder in that by virtue of the invention the adjustment or focusing of the camera is determined by sighting the telescopic range finder, the adjustment of the camera lens and telescope being simultaneously, and the camera lens and telescope being so proportioned that the camera lens is in the proper focus when the telescope is in focus with the object to be photographed.

Generally speaking, my invention contemplates the provision of a small telescopic lens structure through which the operator sights the object to be photographed. The telescope and camera lens are simultaneously movable, the act of adjusting the camera lens being also effective to adjust the telescope, so that when the telescope is in proper focus the camera lens is likewise in proper adjustment.

I will explain one form which my invention may take more in detail by referring to the accompanying drawing, in which—

Figure 1 is a front view of a camera constructed in accordance with my invention;

Fig. 2 is a fragmentary side view thereof;

Fig. 3 is a fragmentary top view thereof, certain portions being broken away more clearly to reveal features of construction;

Fig. 4 is a fragmentary sectional view on line 4—4 of Fig. 3, and

Fig. 5 is a fragmentary detail showing the adjustable feature of a certain part of the device.

Fig. 6 illustrates diagrammatically one method of determining the angle and contour of the cam for actuating the telescopic lens.

Referring to the drawings, I show the customary shelf 10 of a camera as provided with the usual sliding carriage 11, this sliding carriage being moved longitudinally of the shelf 10 through the agency of the knurled finger piece 12. The lens standard 13 of the camera which forms the front portion of the customary collapsible structure, when this collapsible structure is distended, is fastened to the carriage 11 by the pins 14 which are controllable by the finger pieces 15. In the figures I show the lens standard as thus attached to the sliding carriage. When this lens standard is thus attached, it is adjustable through the agency of the finger piece 12 so as to accommodate the camera lens 16 in accordance with the distance that the object is away which it is desired to photograph.

The lens standard 13 is rigidly supported upon the lens carriage 11, this carriage being slidable in the grooves in the rails 24 as indicated in Fig. 1, the carriage being provided with a pair of pivotally supported spring actuated finger pieces 15, the lower ends of which are adapted to engage notched edges of a bracket 31, which is attached to the movable shelf carriage plate 32. This plate 32 is slidable in the side rails 24 and carries a rack which coöperates with the pinion carried by the knurled thumb nut 12 as indicated by the dotted lines in Figs. 1 and 3, thus when the lens standard 13 is drawn out of the camera casing onto the shelf 10, the lens carriage 11 which supports the lens standard 13 slides forward in the grooved rails 24 until the finger lever 15 snaps into notched edges of the bracket 31, locking the lens standard carriage 11 onto the shelf carriage plate 32. Thus, when the thumb nut 12 is rotated, the carriage plate 32, carriage 11, and lens standard 13 are adjusted upon the shelf 10.

Upon the lens standard 13 I also mount a telescopic lens structure 17 which has the movable eye piece 18. This eye piece has a backwardly extending tube 19 and telescopes with the external tube 20. Screws 21 mounted in opposite sides of the outer tube 20 operate in conjunction with slots 22 to prevent relative rotation between the tubes 19 and 20. This eye piece 18 carries a downwardly extending pin 23 by means of which the eye piece is moved inwardly and outwardly so as to focus it upon the object at which it is pointed and it is desired to photograph.

This lens structure 17, as stated, is movable with the lens standard 13 and hence movable with the carriage 11 whenever the finger piece 12 is adjusted. The customary rails 24 are provided within which the carriage 11 slides. One of the rails 24 is provided with a cam shaped shelf 25 fixedly secured thereto, which cam shaped shelf coöperates with the pin 23. Thus whenever the carriage 11 slides forwardly the pin rides along the cam surface of the shelf 25 and thereby moves the eye piece 18 outwardly or inwardly depending upon the direction of movement of the carriage 11, the spring 30 pressing the movable eye piece 18 and its pin 23 inwardly so that the pin 23 rides upon the cam edge of the shelf 25. Thus, if the lens standard 13 with its associated telescope are moved backward and forward, the coöperation of the telescope pin 23 and cam 25 effects an adjustment of the focusing telescope.

As to the relative adjustment of the camera lens and the focusing telescopes, I preferably employ a telescope having an adjustment comparatively short, that is, relative to the movement of the camera lens. For instance assuming an adjustment of about three quarters of an inch for the camera lens from zero to infinity (100 feet) and an adjustment of the telescope of about one quarter of an inch for the same distance, the cam 25 would be about as shown in Fig. 3. Of course, it is to be understood that the relation between the telescope and camera lens is a matter of choice and may be readily determined by the lens meter. In order to determine the shape of the cam 25 one side is made to correspond in length with the travel of the camera lens through the predetermined distance, and its other side correspond to the movement of the telescope through an adjustment having a like distance, and the result will give an angle for the cam surface which is close enough for practical purposes.

In Fig. 6 I have shown one method of determining the angle or contour of the actuating surface of the cam 25. In order to plot this curve the focal length of the camera as $a$ to $b$ is laid out as shown in the diagram and then the focal length of the telescope for the same distance is laid out as from $a$ to $c$. The line $a$, $b$ is then marked off for certain focal distances as at points $e$ which for example might be 6, 8, 15, 25 and 100 feet and then the corresponding distances are laid out at points $f$ along the line $a$, $c$. The points $e$, $f$ are then extended as shown in the diagram this determining the curve or contour $d$ of the cam. This lay-out, of course, may be determined in various ways either by experiment or by calculation of the lens maker. Of course, in standard cameras the distance $a$, $b$ is usually laid out on the focusing indicator and if a telescopic range finder is added the corresponding distances between $a$ and $c$ may be determined by experiment. The curve $d$ will then give the proper shape for the actuating surface of the cam 25.

Thus should it be desired to focus the camera upon a given object, the operator looks through the eye piece of the telescopic lens and manipulates the finger piece 12 until such a time as he has an exact focus of the object. He then knows that his camera lens 16 is in the proper position for photographing that particular object, the cam shelf 25 being of course placed in such a position so that the movements of the lens standard 13 are proportioned to the movements of the eye piece 18.

In Fig. 5, I show this cam structure 25 as being held in place through the agency of the alining screw 26, slidably engaging the upper faces of the slot 27, this slot 27 being provided in this cam shelf structure. A locking screw 28 then holds this cam structure securely in its properly adjusted position.

From what has been thus described, it will be apparent that my invention provides an easy means for adjusting the camera lens so as to accommodate for the distance the object is away. This of course avoids guess work and makes it possible to take pictures of better outline and more distinct in character.

Having thus described one form which my invention may take, what I claim as new and desire to secure by Letters Patent is:

1. A range finder for cameras comprising an adjustable lens standard, an auxiliary telescopic focusing lens carried transversely of and by said standard, means for adjusting said lens standard, a rail along which said standard is movable, and a cam interposed between said rail and said focusing lens so as to effect a simultaneous adjustment of the camera and auxiliary lens.

2. A range finder for cameras comprising an adjustable lens standard, an auxiliary telescopic focusing lens entirely carried by said standard, the telescopic lens and camera lens being proportioned so that the camera lens is focused when the telescope is focused, and means whereby the telescope is automatically adjusted when said standard is adjusted.

3. A range finder for cameras comprising an adjustable lens standard, an auxiliary telescopic focusing lens entirely carried transversely of the camera by said standard, the telescopic lens and camera lens being proportioned so that the camera lens is focused when the telescope is focused, and means whereby the telescope is automatically adjusted when said standard is adjusted.

4. A range finder for cameras comprising a shelf, an adjustable lens standard, an auxiliary telescoping focusing lens mounted at the base of the standard transversely of the camera and movable directly with the standard, and a cam carried by the shelf for controlling the telescope whereby the lens standard and focusing telescope are simultaneously adjustable.

5. A range finder for cameras comprising a casing and front shelf foldable into a face of the casing, an adjustable lens standard foldable within the casing and movable on the shelf, an auxiliary telescopic focusing lens mounted at the base of the standard and carried directly therewith, and means carried by the shelf for controlling the telescope whereby the lens standard and focusing telescope are simultaneously adjustable.

In witness whereof, I hereunto subscribe my name this 3rd day of February, A. D. 1917.

EDGAR E. WEBSTER.

Witnesses:
  HAZEL A. JONES,
  MAX W. ZABEL.